Dec. 19, 1933.  E. A. BERTRAM  1,939,949
SMOKE TREATING DEVICE
Filed Sept. 29, 1931
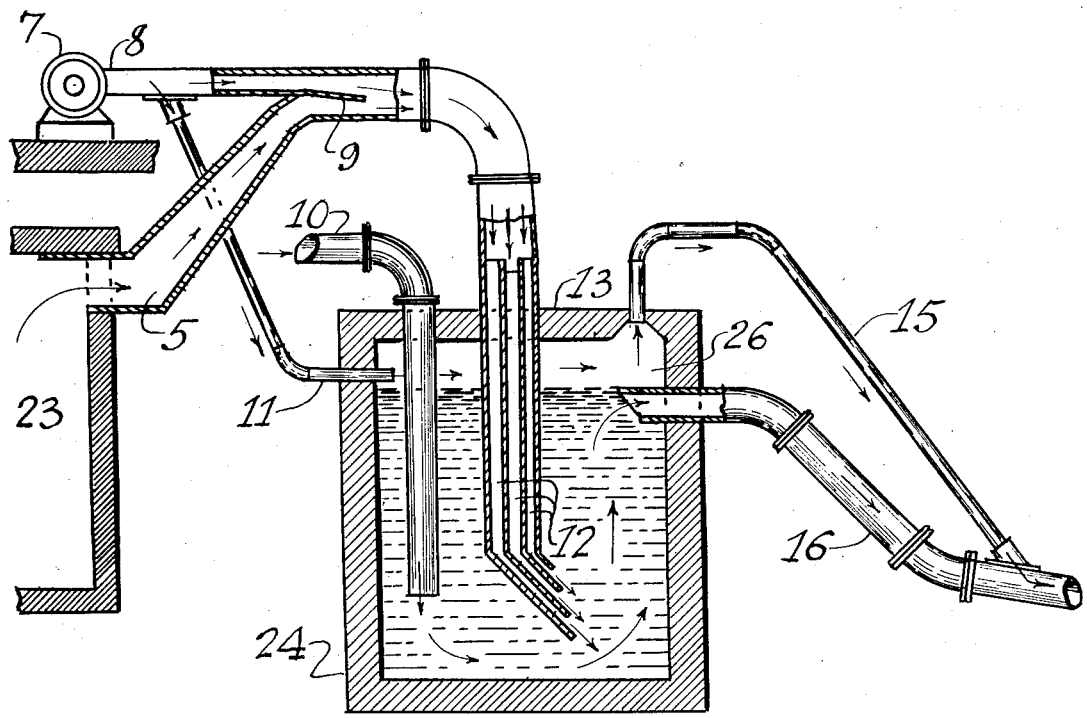
INVENTOR
Edward A. Bertram

UNITED STATES PATENT OFFICE 1,939,949

SMOKE TREATING DEVICE

Edward A. Bertram, Berkeley, Calif.

Application September 29, 1931
Serial No. 565,798

2 Claims. (Cl. 261—121)

The invention relates to improvements in a smoke, gas, and odor treating or consuming device, and the objects of the improvements are, first, to arrest and prevent suspended carbon, gas, and odor from a furnace to rise into the air; second, to absorb such carbon, gas, and odor by filtration through water; and, third, to remove such filtered water through underground pipes, conduits, or by similar means.

One form of the invention is illustrated in the accompanying drawing which shows the invention in a longitudinal, vertical section, while parts are being depicted in elevation.

In the drawing a portion of a furnace 23 is shown, which furnace is not a part of this invention; it is merely to indicate the source of smoke, the furnace communicates with a smoke exhaust flue 5, from where the smoke is guided downward by a rigidly fastened deflector plate 9 into the zone of the forced draft which enters the smoke exhaust flue 5 at this point, and in the space above the deflector plate 9, the forced draft is created by air pressure delivered from a pressure blower 7, which develops a much greater downward air pressure in the filtration conduits 12, than the capacity of the resisting upward water pressure therein during the continuous ejection of the smoke, gas and odor coming from the filtration conduits 12 into the water of the filtration tank 24, and by this feature of the invention, a continuous forced draft is supplied which is necesary for the operation.

The discharging lower ends of the filtration conduits 12 are placed in a slanting position for the purpose of reducing the resisting upward water pressure as developed within them during the ejection of smoke, gas and odor into the water of the filtration tank 24.

A water feed pipe 10 supplies the tank 24 continuously with the water needed for the process of filtration, absorption and removal of the suspended carbon, gas and odor, which by air pressure is ejected from the filtration conduits 12 into the water of the tank 24, in the form of bubbles; which after leaving the lower ends of the filtration conduits 12, will rise through the water in the tank 24, and will break up into very small units because of the resistance they have to overcome when they force their way upwards by friction, to the level of the water overflow pipe 16.

The water in the filtration tank 24 is automatically held at a constant level through the overflow into the water overflow pipe 16, through which pipe the absorbed and liquefied suspended carbon, gas and odor is removed to its place of final disposal underground.

The open space 26 in the top of the tank 24, will arrest any gas which might have escaped from the water below; but such gas is immediately removed by air pressure delivered from the by-pass pipe 11, and is forced out by the gas exhaust pipe 15, which leads into the water overflow pipe 16, for the final disposal of such escaped gas.

I am aware that prior to my invention, smoke disposal apparatus, conveying smoke in gaseous form, from a stack direct into a sewer pipe, and other apparatus for smoke washing process has been made. I therefore do not claim such a combination broadly: but

I claim:

1. In a gas treating apparatus including a closed filtration tank having a liquid inlet near its bottom and outlet near its top arranged to form a closed space between the top of said tank and the liquid level; a gas conduit discharging beneath said level; means for creating a forced draft through said conduit; an exhaust pipe leading from said closed space and discharging into said outlet; and a bypass pipe between said forced draft and said closed space.

2. In a gas treating apparatus including a closed filtration tank having a liquid inlet and outlet arranged to maintain a liquid level above said outlet and a closed space between the top of said tank and the liquid level; a gas conduit discharging beneath said liquid level; means for creating a forced draft through said conduit; an overflow pipe connected with said liquid outlet and discharging below said liquid level; an exhaust pipe leading from said closed space and discharging into said overflow pipe.

EDWARD A. BERTRAM.